United States Patent
Mayer et al.

(10) Patent No.: US 11,438,409 B2
(45) Date of Patent: Sep. 6, 2022

(54) INTERFACE APPARATUS FOR A DATA INTERCHANGE BETWEEN A FIELD BUS NETWORK AND A CLOUD

(71) Applicant: Endress+Hauser Process Solutions AG, Reinach (CH)

(72) Inventors: Michael Mayer, Oberwil (CH); Axel Pöschmann, Basel (CH); Michael Maneval, Schopfheim (DE)

(73) Assignee: ENDRESS+HAUSER PROCESS SOLUTIONS AG, Reinach (CH)

( * ) Notice: Subject to any disclaimer, the term of this patent is extended or adjusted under 35 U.S.C. 154(b) by 0 days.

(21) Appl. No.: 16/767,404

(22) PCT Filed: Oct. 2, 2018

(86) PCT No.: PCT/EP2018/076833
§ 371 (c)(1),
(2) Date: May 27, 2020

(87) PCT Pub. No.: WO2019/101408
PCT Pub. Date: May 31, 2019

(65) Prior Publication Data
US 2020/0389520 A1    Dec. 10, 2020

(30) Foreign Application Priority Data
Nov. 27, 2017  (DE) .................. 10 2017 127 903.2

(51) Int. Cl.
*H04L 67/1031*   (2022.01)
*H04L 12/40*     (2006.01)
*H04L 67/02*     (2022.01)
*H04L 67/1008*   (2022.01)

(52) U.S. Cl.
CPC ......... *H04L 67/1031* (2013.01); *H04L 12/40* (2013.01); *H04L 67/02* (2013.01); *H04L 67/1008* (2013.01)

(58) Field of Classification Search
CPC ..... H04L 67/1031; H04L 12/40; H04L 67/02; H04L 67/1008
(Continued)

(56) References Cited

U.S. PATENT DOCUMENTS

2008/0270438 A1* 10/2008 Aronson ............... G16H 10/60
                                                        714/48
2013/0211546 A1*  8/2013 Lawson ................. H04L 67/16
                                                        700/9
(Continued)

FOREIGN PATENT DOCUMENTS

CN    104767812 A    7/2015
CN    104954242 A    9/2015
(Continued)

OTHER PUBLICATIONS

Zhao, google translation of WO 2019/007353, retrieved from "https://patents.google.com/patent/WO2019007353A1/en?oq=WO+2019007353", Jul. 6, 2017 (Year: 2017).*

Primary Examiner — Hee Soo Kim
Assistant Examiner — Chong G Kim
(74) *Attorney, Agent, or Firm* — Mark A. Logan; Endress+Hauser (USA) Holding Inc.

(57) ABSTRACT

Described is an interface apparatus for performing data interchange, or exchange, between a fieldbus network and a cloud. The interface apparatus includes a first interface, via which the interface apparatus is connectable with at least one fieldbus component of the fieldbus network, and a second interface, via which the interface apparatus is connectable with the cloud. The first interface is embodied as an interface corresponding to the application programming interface of the cloud, wherein an interface definition of the first interface agrees with an interface definition of the application programming interface of the cloud. The interface apparatus is embodied to convert a request for a cloud
(Continued)

service received via the first interface from a fieldbus component of the fieldbus network into a request addressed to the cloud for a cloud service and to transfer such via the second interface to the cloud.

4 Claims, 5 Drawing Sheets

(58) Field of Classification Search
 USPC .......................................................... 709/223
 See application file for complete search history.

(56) References Cited

U.S. PATENT DOCUMENTS

| | | | |
|---|---|---|---|
| 2013/0212214 A1* | 8/2013 | Lawson | ................ H04L 43/045 |
| | | | 709/217 |
| 2014/0047064 A1 | 2/2014 | Maturana et al. | |
| 2015/0281356 A1* | 10/2015 | Maturana | .............. G06F 9/5072 |
| | | | 709/217 |
| 2016/0294617 A1* | 10/2016 | Patri | ..................... H04L 69/329 |
| 2017/0272316 A1 | 9/2017 | Johnson et al. | |

FOREIGN PATENT DOCUMENTS

| | | | |
|---|---|---|---|
| CN | 105074596 A | 11/2015 | |
| CN | 106951221 A | 7/2017 | |
| CN | 107357660 A | 11/2017 | |
| EP | 2660667 A2 | 11/2013 | |
| WO | 2016014642 A1 | 1/2016 | |
| WO | WO-2019007353 A1 * | 1/2019 | ........... G06F 9/5077 |

* cited by examiner

INTERFACE APPARATUS FOR A DATA INTERCHANGE BETWEEN A FIELD BUS NETWORK AND A CLOUD

CROSS-REFERENCE TO RELATED APPLICATIONS

The present application is related to and claims the priority benefit of German Patent Application No. 10 2017 127 903.2, filed on Nov. 27, 2017 and International Patent Application No. PCT/EP2018/076833 filed on Oct. 2, 2018, the entire contents of which are incorporated herein by reference.

TECHNICAL FIELD

The invention relates to an interface apparatus for performing data interchange, or exchange, between a fieldbus network and a cloud as well as to a fieldbus network with an interface apparatus. Moreover, the invention relates to a method for transferring requests for cloud services from a fieldbus network to a cloud.

BACKGROUND

In automation technology, field devices are often applied, which serve for registering and/or influencing process variables. Examples of such field devices include fill level measuring devices, mass flow measuring devices, pressure- and temperature measuring devices, etc., which as sensors register the corresponding process variables, fill level, flow, pressure, or temperature.

For logging, documentation and later evaluation of the data occurring within a fieldbus network, the fieldbus network, or individual field devices of the fieldbus network, can be provided with access to a cloud. In this way, selected parameters of the field devices as well as, for example, data for monitoring the device state can be written into the cloud. In such case, it is also possible to query individual parameters in fixed time intervals from a field device and to write such parameters into the cloud.

SUMMARY

An object of the invention is to provide an interface apparatus for data interchange, or exchange, between a field bus network and a cloud. The interface apparatus simplifies data transfer from devices of the field bus network via the interface apparatus to the cloud.

Advantageous further developments of the invention are set forth in the dependent claims.

An interface apparatus in accordance with forms of embodiment of the invention serves for performing data interchange, or exchange, between a fieldbus network and a cloud. The interface apparatus includes a first interface, via which the interface apparatus is connectable with at least one fieldbus component of the fieldbus network, and a second interface, via which the interface apparatus is connectable with the cloud. The first interface is embodied as an interface corresponding to an application programming interface of the cloud, wherein an interface definition of the first interface agrees with an interface definition of the application programming interface of the cloud. The interface apparatus is embodied to convert a request for a cloud service received via the first interface from a fieldbus component of the fieldbus network into a request addressed to the cloud for a cloud service and to transfer such via the second interface to the cloud.

The interface apparatus is embodied to orchestrate, for the fieldbus network, data interchange, or exchange, with the cloud. In order to access a cloud service, a fieldbus component sends a request for the cloud service to the interface apparatus. The interface apparatus receives the request via the first interface, converts the request into a request addressed to the cloud and transfers the request via the second interface to the cloud.

In such case, the first interface of the interface apparatus, to which the fieldbus components send the requests for cloud services, corresponds to the application programming interface of the cloud, which is also referred to as the API (Application Programming Interface) of the cloud. Thus, the interface apparatus provides within the fieldbus network a local copy of the application programming interface of the cloud, to which requests for cloud services can be directed exactly in the same manner as would be required in the case of the actual application programming interface of the cloud. For example, services in the form of Web services are callable via the application programming interface of the cloud and via the local copy of the application programming interface of the cloud provided by the interface apparatus. The interface definition of the first interface agrees with the interface definition of the application programming interface of the cloud. For a network component, the first interface is accessible in exactly the same manner and with the same syntax as the actual application programming interface of the cloud. Thus, requests for cloud services, which are directed to the first interface of the interface apparatus, do not differ as regards format and syntax from requests for cloud services sent directly to the cloud. The requests for cloud services directed to the interface apparatus are sent to the address of the interface apparatus, while, in contrast, requests for cloud services sent directly to the cloud are sent to the address of the cloud. Requests for cloud services directed to the interface apparatus differ thus in the destination address from requests for cloud services sent directly to the cloud.

Since the interface apparatus provides a first interface, which exactly agrees with the application programming interface of the cloud, the production of requests for cloud services is simplified for the network components. A fieldbus component of the fieldbus network needs only a single protocol stack for producing requests for cloud services, independently of whether the request is directed to the cloud or to an interface apparatus. This has the advantage that effort associated with maintenance and updating of the protocol stack is reduced. Moreover, the configuration of the network components is simplified. For example, a fieldbus component can for accessing Web services be provided with a correspondingly designed HTTP- or HTTPS protocol stack, with which calls for Web services can be produced selectively for the cloud or for the interface apparatus.

The interface apparatus enables that a total data interchange, or exchange, between the fieldbus components and the cloud can be orchestrated via the interface apparatus. Instead of constructing a plurality of data connections between the fieldbus components and the cloud, only one data connection is established between the interface apparatus and the cloud. This is especially advantageous as regards IT-security, because the monitoring of this one data connection, for example, by means of a firewall, requires significantly less administrative effort than the monitoring of a plurality of individual data connections. By funneling the data traffic to the cloud through one interface apparatus, IT-security is improved, wherein the effort for maintaining and updating the IT-security structures is lessened. Especially, it is no longer necessary to perform an updating of the security settings for each new device in the fieldbus network.

A fieldbus network in accordance with forms of embodiment of the invention includes a fieldbus, at least one fieldbus component connected to the fieldbus as well as at least one interface apparatus, such as above described, for performing data interchange, or exchange, with a cloud. In the case of such a fieldbus network, the entire data interchange, or exchange, with the cloud is conducted centrally via the interface apparatus.

A method in accordance with forms of embodiment of the invention serves for transferring requests for cloud services from a fieldbus network to a cloud. The fieldbus network includes a fieldbus, at least one fieldbus component connected to the fieldbus, as well as an interface apparatus. The interface apparatus includes a first interface, via which the interface apparatus is connectable with at least one fieldbus component of the fieldbus network, and a second interface for connection with the cloud, wherein the first interface is embodied as an interface corresponding to an application programming interface of the cloud and wherein an interface definition of the first interface agrees with an interface definition of the application programming interface of the cloud. The method includes receiving by the interface apparatus via the first interface a request sent from a fieldbus component to the interface apparatus for a cloud service, and converting the request for a cloud service received via the first interface by the interface apparatus into a request for a cloud service addressed to the cloud and transferring the request for a cloud service via the second interface to the cloud.

BRIEF DESCRIPTION OF THE DRAWINGS

The invention will now be explained in greater detail based on examples of embodiments illustrated in the drawing. The figures of the drawing show as follows.

DETAILED DESCRIPTION

Both in the case of individual measuring stations with only one field device as well as also in the case of fieldbus networks with a greater number of field devices, there is the need to write parameter values and measured values of the field devices into a cloud. The data written into the cloud can be used, for example, for function monitoring, quality documentation as well as also for diagnosis of the device state.

Figure 1:
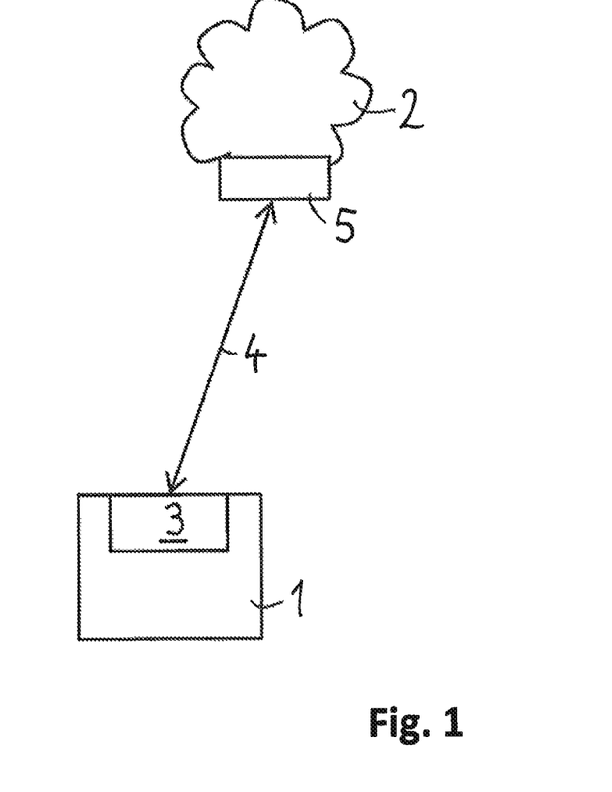
FIG. 1 shows a measuring station, which is connected to a cloud via a wireless data connection.

FIG. 1 show how an interface to a cloud 2 can be implemented for an individual field device 1. For this, a cloud client 3 is installed in the field device 1. The cloud client 3 can access the application programming interface 5 of the cloud 2, for example, via a wireless data connection 4. The application programming interface 5 of the cloud 2 is also referred to as a "cloud server API", wherein the acronym "API" stands for "Application Programming Interface". Especially, the cloud client 3 can, via the wireless data connection 4 and the application programming interface 5, request cloud services, which are provided by the cloud 2 in the form of Web services. For example, the cloud client 3 can access the cloud 2 via the wireless data connection 4 and by means of provided database operations enter, read out, change or erase a record for the field device 1 in the cloud 2. The wireless data connection 4 can be, for example, a communication connection according to one of the mobile radio standards, GSM, 3G, 4G or LTE, or some another wireless data transfer connection, e.g. WLAN.

Figure 2:
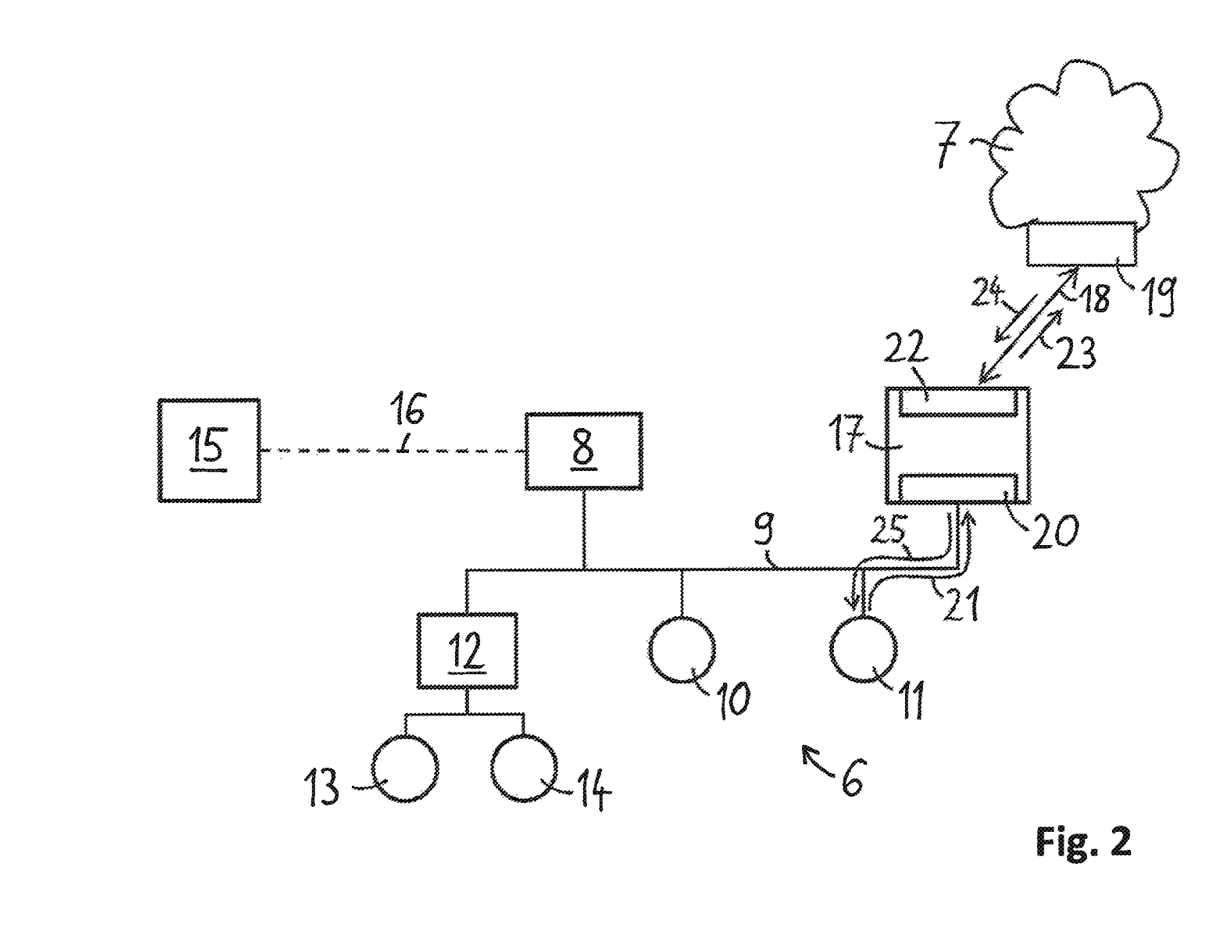
FIG. 2 shows a fieldbus network with an interface apparatus for a centralized data transfer between the fieldbus network and the cloud.

Shown in FIG. 2 is the interfacing of a fieldbus network 6 to a cloud 7. The fieldbus network 6 includes a field access device 8, a fieldbus 9, as well as two field devices 10 and 11 connected to the fieldbus 9. Connected to the fieldbus 9 is, moreover, a gateway device 12, with which two other field devices 13 and 14 are connected. For parametering and configuring of the different components of the fieldbus network 6, they can be accessed from a host 15 via the data connection 16 and the field access device 8.

The different field devices, gateway devices and other components of the fieldbus network 6 can, moreover, interchange, or exchange, data with the cloud 7. Placed In the cloud 7 for a certain component of the fieldbus network 6 can be a corresponding record, which is associated with the component. Stored in this record can be, for example, parameter values of the component. The record in the cloud 7 can be identified based on an identifier, which is unique for the component, wherein used as identifier can be, for example, its manufacturer and serial number. Alternatively, used as identifier can be, for example, a UUID (Universally Unique Identifier) of a component or a MAC address (media access control address) of the network card of a component or a unique identifier of the SIM card (Subscriber Identity Module) of a component. The user identifies itself to the cloud 7 by means of username and password and can then access Web services provided by the cloud 7. Especially, the user can, via the application programming interface 19 of the cloud 7, access records for the various fieldbus components.

For interfacing the different field devices, gateway devices and other components of the fieldbus network 6 with the cloud 7, it could, for example, be provided that each component builds, as in the case of FIG. 1, a separate connection with the cloud 7. For this, it would, however, be required, to allow for the construction of a plurality of parallel connections to the cloud 7. In view of security standards for industrial Ethernet networks, this would, however, require checking and authorizing each of these data connections by a firewall, which would cause a considerable administrative burden. Therefore, it is preferable to run the communication of the different field devices, gateway devices and other components of the fieldbus network 6 with the cloud 7 through a single, central interface apparatus 17. FIG. 2 shows such an interface apparatus 17, which is connected to the fieldbus 9, wherein the data interchange, or exchange, with the cloud 7 occurs via one data connection 18. The entire data traffic between the fieldbus network 6 and the cloud 7 is conducted via a single data connection 18. This has the advantage that the data traffic between the fieldbus network 6 and the cloud 7 can be controlled in simple manner by the firewall.

The accessing of the cloud 7 occurs via an application programming interface 19 of the cloud 7, which is also referred to as the "cloud server API". Database services provided from the cloud 7 can be accessed via the application programming interface 19 of the cloud 7. In such case, the database services provided by the cloud 7 can be accessed especially by means of the database operations known as CRUD operations, wherein the acronym "CRUD" stands for "Create, Read, Update, Delete". CRUD operations comprise the placing ("Create") of a record in the cloud 7, the read-out ("reed") of a record, the updating ("update") of a record, as well as the deleting ("Delete") of a record in the cloud 7. The cloud services can, however, also comprise other, differently structured or additional cloud services. According to the interface definition of the application programming interface 19 of the cloud 7, each of the services provided from the cloud 7 can be accessed with a request of defined syntax and semantics.

For the data transfer from a fieldbus component to the interface apparatus, it was previously required to provide a fieldbus component with two protocol stacks, namely a first protocol stack for the direct data transfer from the fieldbus component via the Internet to the cloud and supplementally a second protocol stack for data transfer from the fieldbus component to an interface apparatus. For example, for the direct data transfer via the Internet to the cloud, an HTTP- or HTTPS protocol stack was provided in the fieldbus component. In contrast, if the data transfer was conducted from the fieldbus component to the interface apparatus, for example, via the fieldbus, for example, a protocol stack for a fieldbus protocol was provided for this. It was thus necessary, for data transfer from the fieldbus component to the interface apparatus, to provide in the fieldbus component a separate, additional protocol stack, which orchestrated the communication between the fieldbus component and the interface apparatus. The maintenance and updating of two separate protocol stack meant, however, extra effort in view of the large number of different hardware- and software versions.

In the case of the present invention, another approach is taken, in order to write data from a component of the fieldbus network 6 via the interface apparatus 17 into the cloud 7. In the present invention, the fieldbus network 6 is provided by the interface apparatus 17 with a local application programming interface 20, which represents an exact copy of the application programming interface 19 of the cloud 7 and provides the same cloud services as the actual application programming interface 19 of the cloud 7. Since the local application programming interface 20 provides the same Web services as the original application programming interface 19 of the cloud 7, a fieldbus component can access the local application programming interface 20 in the same manner as it would access the actual application programming interface 19, wherein only another destination address is used. Especially, the fieldbus component can use the same protocol stack, for example, an HTTP- or HTTPS protocol stack, for accessing the local application programming interface 20 and for accessing the application programming interface 19. The interface definition of the local application programming interface 20 of the interface apparatus 17 agrees, in such case, exactly with the interface definition of the application programming interface 19 of the cloud 7, so that the requesting of available cloud services in the case of the local application programming interface 20 of the interface apparatus 17 occurs with the same syntax and semantics as the requesting of Web services via the application programming interface 19.

In order to access one of the offered cloud services, the field device 11 can, for example, produce a request for the desired cloud service by means of a protocol stack implemented in the field device 11. The so produced request is then sent to the local application programming interface 20 of the interface apparatus 17, such as shown in FIG. 2 by the arrow 21. Preferably, the request for a cloud service is sent via the fieldbus 9 from the field device 11 to the application programming interface 20. In such case, the data transfer between the field device 11 and the application programming interface 20 can occur via the fieldbus 9, for example, by means of Ethernet packets. Instead of transfer by means of Ethernet packets, also transfer via ATM data packets or via another physical layer can be considered. Alternatively, there could be provided or established between the field device 11 and, in given cases, additional fieldbus components, on the one hand, and the interface apparatus 17, on the other hand, additional data connections, via which the request for a cloud service is transferable from the field device 11 to the interface apparatus 17. For example, there could be provided or established between the field device 11 and the interface apparatus 17 a wireless communication connection, such as, for example, a WLAN connection or a mobile radio connection, via which requests for cloud services are transferable from the field device 11 to the interface apparatus 17.

At the interface apparatus 17, a request for a cloud service is received. When the request from the field device 11 to the interface apparatus 17 is a request valid according to the interface definition for a cloud service, the request is further processed by the interface apparatus 17. For this, the interface apparatus 17 translates the request for a cloud service into a request addressed to the cloud 7 for a cloud service. The address of the cloud 7 is given as new destination address for the request for a cloud service previously addressed to the interface apparatus 17. Provided on the interface apparatus 17 is a cloud client interface 22 for data interchange, or exchange, with the cloud 7. The interface apparatus 17 transfers the request for cloud service via the cloud client interface 22 and the data connection 18 to the application programming interface 19 of the cloud 7, such as shown in FIG. 2 by the arrow 23. At the cloud 7, the request obtained from the interface apparatus 17 is processed. The requested cloud service is performed and the record for the field device 11, which is preferably identified via manufacturer and serial number of the field device 11, is created, read-out, changed or deleted according to the received request.

In the reverse direction, data and reports can be transferred from the cloud 7 to the interface apparatus 17 and from there further to the relevant fieldbus component. For example, a confirmation of a received request or data of a read-out record can be transferred from the application programming interface 19 of the cloud 7 via the data connection 18 to the cloud client interface 22 of the interface apparatus 17, such as shown in FIG. 2 by the arrow 24. In the case of need, the data and reports received by the interface apparatus 17 can be transferred further via the application programming interface 20 and the fieldbus 9 to the relevant fieldbus component, for example, the field device 11, such as shown in FIG. 2 by the arrow 25.

Figure 3:
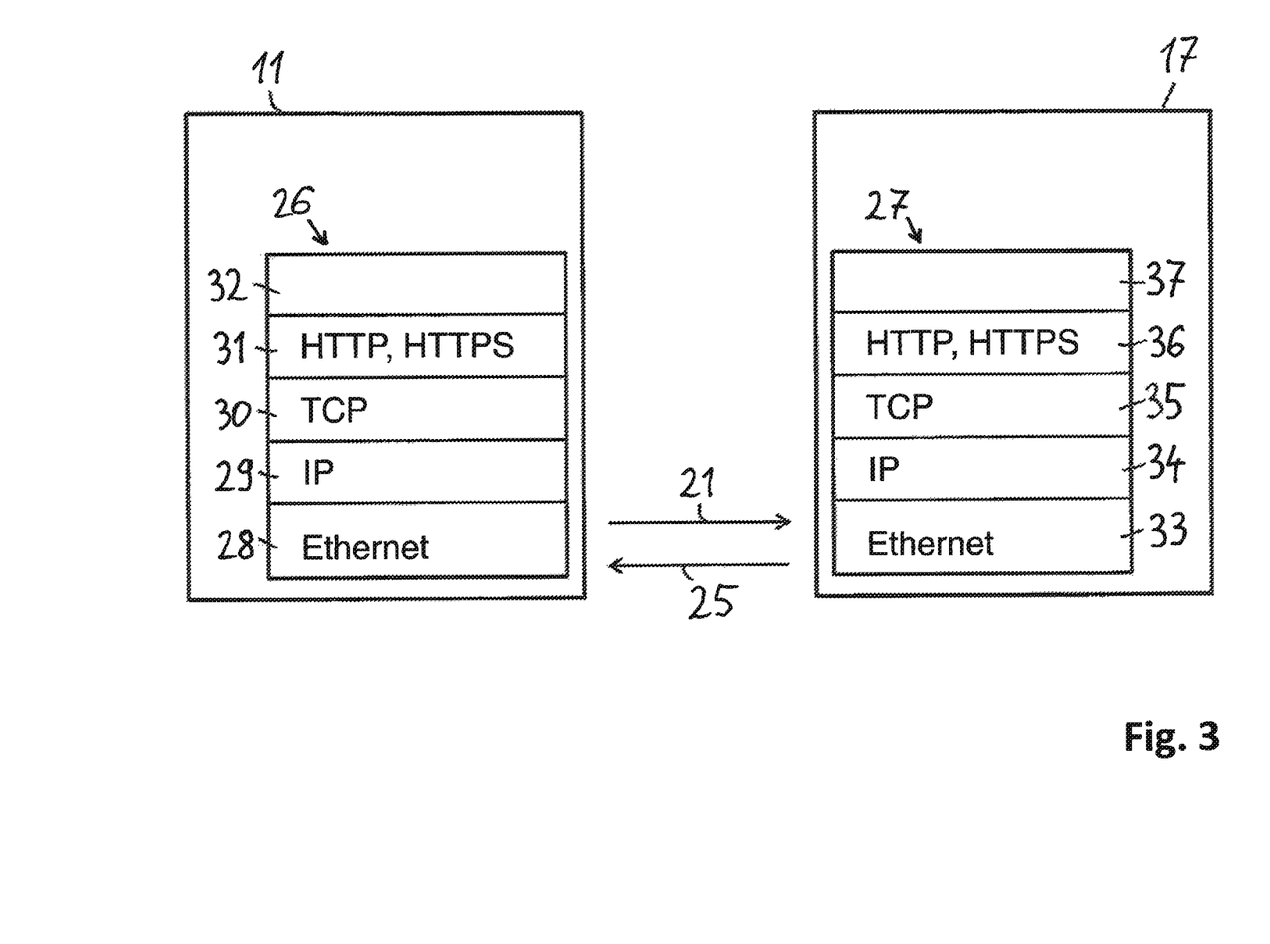
FIG. 3 shows a data transfer between a field device and the interface apparatus, wherein protocol stacks are shown in each.

FIG. 3 shows how data traffic, which is to be transferred to the cloud 7, is transferred from the field device 11 to the interface apparatus 17 and how reports and data received in the reverse direction from the cloud 7 are transferred from the interface apparatus 17 to the field device 11. A protocol stack 26 is provided in the field device 11 and a corresponding protocol stack 27 in the interface apparatus 17. Preferably, the protocol stacks 26, 27 are HTTP-, or HTTPS, protocol stacks.

By means of the protocol stack 26, a request for a data base operation can be produced and the request transferred, as shown by the arrow 21, to the interface apparatus 17. The protocol stack 26 includes an Ethernet layer 28, an IP layer 29, a TCP layer 30 as well as an HTTP- or HTTPS layer 31 on top. Implemented above the HTTP-, or HTTPS, layer 31 is an application-specific layer 32, which is provided for the requesting of the cloud services. In this application-specific layer 32, the above mentioned CRUD operations, thus the database operations required for interacting with the cloud services, are defined. By means of the CRUD operations, records in the cloud 7 can be created, read-out, modified or deleted. Preferably, used for the CRUD operations in the application-specific layer 32 are HTTP commands, such as GET and POST. Moreover, there are defined in the application-specific layer 32 data objects, which are required for accessing records of the cloud 7, especially, for example, data objects for assets, manufacturers and device types as well as links between these data objects. Besides the basic database operations and the data objects, there can be placed in the application-specific layer 32 at least one flow diagram, which provides a sequence of operations, which need to be followed when accessing cloud services. Thus, for example, it can be provided that before creating a new record for a fieldbus component, it must be checked, whether a record is already present in the cloud for this fieldbus component. Only after determining corresponding to the flow diagram that there is as yet no record, can in the next step the desired record be created.

The protocol stack 27 provided in the interface apparatus 17 is preferably likewise embodied as an HTTP- or HTTPS protocol stack and corresponds to the protocol stack 26 provided in the field device 11. Protocol stack 27 includes an Ethernet layer 33, an IP layer 34, a TCP layer 35 and an HTTP-, or HTTPS, layer 36. Provided above the HTTP-, or HTTPS, layer 36 is an application-specific layer 37, which is embodied to decrypt and to check a request received for a cloud service. For this, there are specified within the application-specific layer 37, exactly as in the corresponding layer 32 of the field device 11, the CRUD operations required for interacting with the cloud services. Moreover, used data objects are established. Also, the at least one flow diagram, which describes a sequence of operations to be followed in the case of a request for cloud services, can be defined in the application-specific layer 37.

A request for a cloud service received from the field device 11 is decrypted by the protocol stack 27. In such case, the application-specific layer 37 checks whether the request is a valid request for a data base operation, whether the objects specified in the request as well as their links are defined and whether a given flow diagram is being followed. When the request received for a cloud service is not a valid request, the request is rejected or an error report is output. When the request for the cloud service is, in contrast, valid, then the interface apparatus 17 converts the request into a request addressed to the cloud 7 for a cloud service and transfers the request to the cloud 7. In the reverse direction, the interface apparatus 17 receives from the cloud 7 reports and data, which are converted by the protocol stack 27 into data packets addressed to the field device 11, and transfers such in the direction of the arrow 25 to the field device 11. In the field device 11, the reports and data received from the cloud 7 are decrypted by the protocol stack 26.

Figure 4:
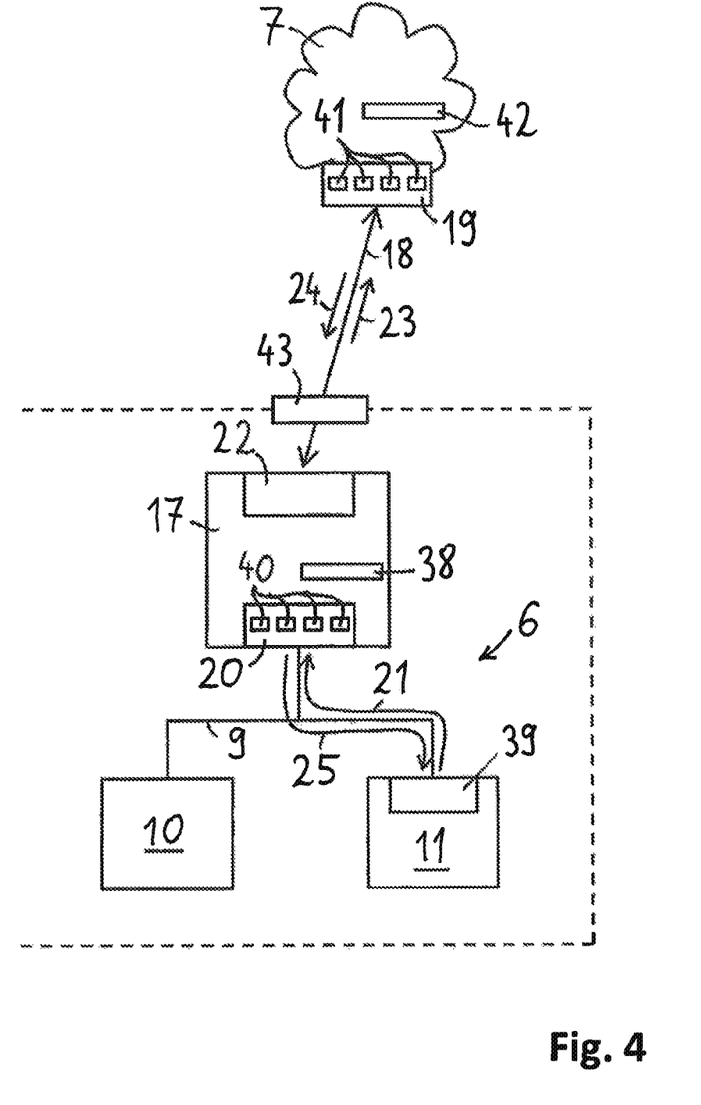
FIG. 4 shows a detailed representation of the data interchange, or exchange, between a fieldbus component, the interface apparatus and the cloud.

FIG. 4 details the communication steps. In such case, it is to be assumed that the field device 11 wants to update its record in the cloud 7, wherein more parameter values are to be added to the existing record. For this, the field device 11 creates a request for the cloud service responsible for updating a record, wherein specified as IP-address for this request is the IP-address 38 of the interface apparatus 17. Alternatively, the request for cloud service could also be addressed to a domain name of the interface apparatus 17, wherein, in this case, the domain name would be converted by a name server into the associated IP-address of the interface apparatus 17. The request for cloud service is transferred via the cloud client interface 39 of the field device 11 and via the fieldbus 9, as shown by the arrow 21, to the application programming interface 20 of the interface apparatus 17. The application programming interface 20 provided by the interface apparatus 17 corresponds, in such case, exactly to the application programming interface 19 of the cloud 7, wherein the cloud services 40 requestable according to the interface definition of the application programming interface 20 agree with the cloud services 41 provided by the application programming interface 19. Preferably, the code for implementing the application programming interface 20 of the interface apparatus 17 is the same as that used for implementing the application programming interface 19 of the cloud 7.

The request for a cloud service transferred as shown by the arrow 21 from the field device 11 to the interface apparatus 17 is received by the application programming interface 20 and evaluated. When the transferred request is a valid request for a cloud service 40, the request for cloud service is processed further by the interface apparatus 17 and converted into a request directed to the cloud 7. When, in contrast, it turns out that the transferred request is not a valid request for a cloud service provided in the application programming interface 20, then the request is not processed further or an error report is output. In the case of a valid request, the interface apparatus 17 converts the request received via the application programming interface 20 into a request directed to the application programming interface 19 of the cloud 7. For this, the IP-address 38 of the interface apparatus 17 contained in the received request is replaced by the IP-address 42 of the cloud 7. Otherwise, as a rule, no additional modifications of the received request are performed, so that the request is transferred in essentially unchanged form via the cloud client interface 22 of the interface apparatus 17 and the data connection 18, as shown by the arrow 23, to the application programming interface 19 of the cloud 7. In such case, the data flow transferred via the data connection 18 is checked by the firewall 43 of the industrial Ethernet network. By means of the request transferred to the cloud 7, a desired cloud service can be requested, because the cloud services 40 specified in the interface definition of the application programming interface 20 correspond the cloud services 41 defined in the application programming interface 19. In the present example, thus the cloud service responsible for updating the cloud record for the field device 11 is requested and performed, wherein the record is updated by the data brought along in the request.

In the reverse direction, for example, read out data of a record or a confirmation by the cloud 7 of a request can be transferred to the interface apparatus 17 and from there, in given cases, further to the field device 11. For example, a confirmation report can be transferred via the application programming interface 19 of the cloud 7 in the direction of the arrow 24 via the data connection 18 to the cloud client interface 22 of the interface apparatus 17. The interface apparatus 17 converts the received report into a report addressed to the field device 11 and transfers the report via the application programming interface 20 and the fieldbus 9 to the cloud client interface 39 of the field device 11, such as shown in FIG. 4 by the arrow 25. In this way, the field device 11 receives a confirmation that the request for cloud service was received and processed by the cloud 7. In the case of this method of confirmation of requests, thus, the reports from the cloud 7 are sent transparently through to the field device 11. The field device 11 is informed concerning the processing occurring in the cloud 7, however, time delays can arise until the confirmation report is received. Thus, corresponding to an alternatively or supplementally provided, second confirmation method, it can be provided that the interface apparatus 17 after receiving a request for a cloud service transferred from the field device 11 via the application programming interface 20 and the fieldbus 9 transfers without time delay a confirmation report to the cloud client interface 39 of the field device 11. An advantage of this second confirmation method is especially the lesser time delay until the confirmation is received.

The data transfer between the interface apparatus 17 and the cloud 7 occurs preferably encrypted, wherein a request directed to the cloud 7 for a cloud service is encrypted by the interface apparatus 17. Also, in the reverse direction from the cloud 7 to the interface apparatus 17, the data transfer occurs preferably with encryption. Preferably, a key or a security certificate for the data interchange, or exchange, with the cloud can be stored in the interface apparatus 17, wherein the key or security certificate can be used for encrypting and decrypting the data. Preferably, the key or security certificate is stored exclusively by the interface apparatus 17 and is applied there for encrypting and decrypting the data. Consequently, it is not necessary that the fieldbus components be provided with copies of the key or security certificate. This makes sense as regards security. When a field device is delivered, these measures assure that there is stored in the field device no security information required for accessing the cloud, information which a third party could otherwise utilize for an unauthorized accessing of the cloud.

Moreover, also within the fieldbus network 6, the data transfer between the fieldbus components and the interface apparatus 17 is preferably performed with encryption, wherein for the encryption within the fieldbus network, a security certificate provided therefor is used. Thus, it is necessary that the interface apparatus 17 decrypt the encrypted request for a cloud service transferred from the field device 11, wherein the encryption certificate of the fieldbus network 6 is required for this. Then, the addressing of the request is changed, wherein the IP-address 42 of the cloud 7 is used as the new address. The so obtained request for a cloud service is then encrypted within the interface apparatus 17 by means of the certificate of the cloud 7 and transferred encrypted via the data connection 18 to the cloud 7. In the reverse direction, encrypted data are transferred from the cloud 7 to the interface apparatus 17 and there decrypted, re-addressed and encrypted by means of the certificate of the fieldbus network 6. The encrypted data are then transferred from the interface apparatus 17 to the field device 11. The interface apparatus 17 is, consequently, responsible for encrypting- and decrypting the received and forwarded data streams.

Since the entire data traffic between the fieldbus network 6 and the cloud 7 is conducted via the interface apparatus 17 and the data connection 18, the firewall 43 only needs to monitor the data traffic on the data connection 18. Even when new field devices are connected to the fieldbus network 6 or when existing components of the fieldbus network 6 are replaced, no updating of the settings of the firewall 43 are required. For security monitoring of the data interchange, or exchange, between the interface apparatus 17 and the cloud 7, it is not necessary that the firewall 43 be instructed concerning each change of components of the fieldbus network 6. In this way, the administration of the system is significantly simplified, because the operators of the fieldbus network can automatically undertake hardware- and software changes of the fieldbus network, without that for each of such changes the settings of the IT-security systems must be adapted. Moreover, between the fieldbus network 6 and the cloud 7, only a single data connection 18 is provided, which significantly simplifies the security monitoring of the data traffic between the fieldbus network 6 and the environment.

As a result of the local application programming interface 20 of the interface apparatus 17 of the invention, there is provided within the fieldbus network 6 a duplicate of the application programming interface 19 of the cloud 7 and all data traffic to be transferred to the cloud 7 is directed to this duplicate. The interface apparatus 17 brings together and focusses the data traffic destined for the cloud 7. In such case, the requests for cloud services received from the different field devices, gateway devices and other components of the fieldbus network 6 are processed by the interface apparatus 17 in the order of receipt, so that the different requests are transferred in the order of their arrival sequentially to the cloud 7 and there processed.

In such case, it can especially make sense to provide the interface apparatus 17 with a buffer memory, in which requests for cloud services received from the fieldbus network 6 can be stored temporarily. In this way, it can especially be avoided that, in the case of a disturbed or overloaded data connection 18 to the cloud 7, the requests received from the different components do not get lost. When the data connection 18 to the cloud 7 is thus out of order or overloaded, the requests for cloud services are stored in the buffer memory of the interface apparatus 17 in the order of their arrival, so that none of the requests get lost. When the data connection 18 and the cloud 7 are available again, the stored requests can be transferred sequentially to the cloud 7 and processed there. By means of such a buffer memory, it can thus be prevented that requests for cloud services get lost. The buffer memory can be implemented, for example, as a so called FIFO (First-In First-Out) memory, wherein the stored requests can be managed, for example, using two pointers.

Preferably, the interface apparatus 17 is embodied to convert the received requests transparently into corresponding requests directed to the cloud 7. In such case, as a rule, only the addressing of the request is changed. Additionally, it can, however, also be provided that, for example, an outdated format for cloud access applied within the fieldbus network 6 is, for example, converted by the interface apparatus 17 into a more up to date version. In the case of such a solution, it is only necessary that the interface apparatus 17 use the newest data access format, while, in contrast, within the fieldbus network 6, also outdated versions can be used.

Figure 5:
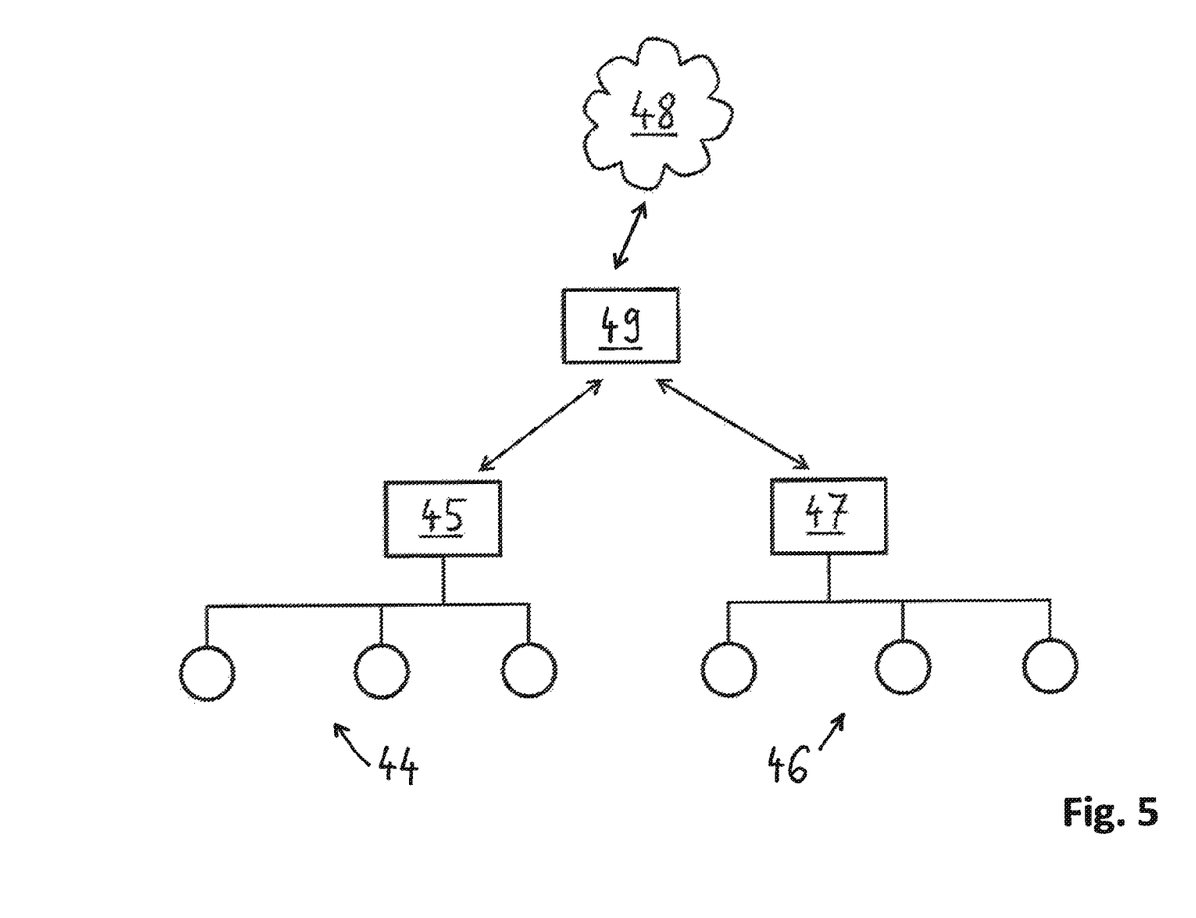
FIG. 5 shows a cascaded arrangement of a plurality of interface apparatuses.

Moreover, the interface apparatuses of the invention can also be used in a cascaded arrangement, in order to bring together and to focus data traffic directed to the cloud from a plurality of fieldbus networks. FIG. 5 shows such a system. Connected to a first fieldbus network 44 is a first interface apparatus 45 and connected to a second fieldbus network 46 is a second interface apparatus 47. Data traffic from the first fieldbus network 44, which is to be transferred to the cloud 48, is addressed, firstly, to the first interface apparatus 45. From there, this data traffic is, however, not sent directly to the cloud 48, but, rather, to the address of an additional interface apparatus 49. The additional interface apparatus 49 receives the data traffic from the first interface apparatus 45 and conducts a re-addressing of the received data packets, wherein as destination address now the address the cloud 48 is provided. Data traffic, which is to be sent from the second fieldbus network 46 to the cloud 48, is, firstly, likewise addressed to the second interface apparatus 47. The second interface apparatus 47 forwards this data traffic to the IP-address of the additional interface apparatus 49. The additional interface apparatus 49 receives this data traffic and re-addresses it to the cloud 48. Thus, the additional interface apparatus 49, which is arranged in a cascade with the first interface apparatus 45 and the second interface apparatus 47, fulfills the object of combining the data traffic from the first fieldbus network 44 and the data traffic from the second fieldbus network 46 and transferring the combined data traffic focused to the cloud 48. In the reverse direction, the additional interface apparatus 49 receives reports and data from the cloud 48 and distributes the received reports and data to the first interface apparatus 45 and to the second interface apparatus 47. From there, the reports and data are transferred to the first fieldbus network 44, and to the second fieldbus network 46, as the case may be.

The invention claimed is:

1. A fieldbus network, comprising:
a fieldbus;
at least one fieldbus component connected to the fieldbus; and
an interface apparatus for performing a data exchange between the fieldbus network and a cloud, the interface apparatus including:
a first interface via which the interface apparatus is connectable with the at least one fieldbus component; and
a second interface via which the interface apparatus is connectable with the cloud,
wherein the first interface corresponds to an application programming interface of the cloud such that an interface definition of the first interface agrees with an interface definition of the application programming interface of the cloud and such that the first interface has a same syntax and a same semantics as the application programming interface of the cloud, and
wherein the interface apparatus is embodied to:
receive via the first interface a request sent from the at least one fieldbus component to the interface apparatus for a cloud service;
convert the request for the cloud service received via the first interface into a request for a cloud service addressed to the cloud by re-addressing the request to an address of the cloud; and
transfer the converted request for the cloud service via the second interface to the cloud.

2. The fieldbus network as claimed in claim 1, wherein the at least one fieldbus component includes at least one of the following: at least one field device, at least one gateway device, at least one other fieldbus component,
wherein the at least one fieldbus component of the fieldbus network is configurable such that requests for cloud services are addressed to the address of the interface apparatus,
wherein at least one of the fieldbus components of the fieldbus network is embodied to transfer requests for cloud services directed to the cloud to a domain name of the interface apparatus,
wherein the domain name is transformable by means of a name server into an address of the interface apparatus, or
the fieldbus network includes a plurality of interface apparatuses in cascaded arrangement.

3. The fieldbus network as claimed in claim 1,
wherein the at least one fieldbus component is provided with an HTTP- or HTTPS protocol stack, which is embodied to produce requests for cloud services,
wherein the at least one fieldbus component is provided with an HTTP- or HTTPS protocol stack, which is embodied selectively to produce requests for cloud services directed to the interface apparatus or directly to the cloud,
wherein the at least one fieldbus component is embodied to transfer requests for cloud services to the interface apparatus in the form of Ethernet packets, or
wherein the interface apparatus provides an HTTP- or HTTPS protocol stack, which is embodied to process requests for cloud services received from a fieldbus component.

4. A method for transferring requests for cloud services from a fieldbus network to a cloud, wherein the fieldbus network includes:
a fieldbus;
at least one fieldbus component connected to the fieldbus network; and
an interface apparatus for performing a data exchange between the fieldbus network and the cloud, the interface apparatus including:
a first interface via which the interface apparatus is connectable with the least one fieldbus component; and
a second interface via which the interface apparatus is connectable with the cloud,
wherein the first interface is corresponds to an application programming interface of the cloud such that an interface definition of the first interface agrees with an interface definition of the application programming interface of the cloud and such that the first interface has a same syntax and a same semantics as the application programming interface of the cloud, and
wherein the interface apparatus is embodied to convert a request for a cloud service received via the first interface from the at least one fieldbus component of the fieldbus network into a request addressed to the cloud for a cloud service and to transfer the converted request via the second interface to the cloud, the method comprising:
receiving by the interface apparatus via the first interface a request sent from the at least one fieldbus component to the interface apparatus for a cloud service;
converting the request for the cloud service received via the first interface by the interface apparatus into a request for a cloud service addressed to the cloud by re-addressing the request to an address of the cloud; and
transferring the converted request for the cloud service via the second interface to the cloud.

* * * * *